(12) United States Patent
Kwon et al.

(10) Patent No.: US 10,848,750 B2
(45) Date of Patent: Nov. 24, 2020

(54) DISPLAY PANEL, STEREOSCOPIC IMAGE DISPLAY PANEL, AND STEREOSCOPIC IMAGE DISPLAY DEVICE HAVING PIXEL LAYOUT BASED ON ARRANGEMENT OF LENS ARRAY TO BE USED THEREWITH

(71) Applicant: SAMSUNG DISPLAY CO., LTD., Yongin-si (KR)

(72) Inventors: Jae-Joong Kwon, Suwon-si (KR); Jung-Hun Noh, Yongin-si (KR); Beom-Shik Kim, Yongin-si (KR); Hyung-Don Na, Seoul (KR); Joo-Woan Cho, Seongnam-si (KR); In-Sun Hwang, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 5 days.

(21) Appl. No.: 15/686,212

(22) Filed: Aug. 25, 2017

(65) Prior Publication Data
US 2018/0115771 A1 Apr. 26, 2018

(30) Foreign Application Priority Data

Oct. 21, 2016 (KR) .................. 10-2016-0137391

(51) Int. Cl.
| | |
|---|---|
| *H04N 13/305* | (2018.01) |
| *H04N 13/317* | (2018.01) |
| *H04N 13/307* | (2018.01) |
| *G09G 3/20* | (2006.01) |
| *H04N 13/324* | (2018.01) |

(Continued)

(52) U.S. Cl.
CPC .......... *H04N 13/305* (2018.05); *G09G 3/003* (2013.01); *G09G 3/2003* (2013.01); *G09G 3/3233* (2013.01); *G09G 3/3275* (2013.01); *H04N 13/307* (2018.05); *H04N 13/317* (2018.05); *H04N 13/324* (2018.05); *G09G 2300/0426* (2013.01); *G09G 2300/0452* (2013.01); *G09G 2300/08* (2013.01); *G09G 2320/0209* (2013.01);

(Continued)

(58) Field of Classification Search
CPC ... G09G 2300/0452; G09G 2320/0209; G09G 3/003; G09G 3/3233; G09G 3/3275; H04N 13/305; H04N 13/307; H04N 13/317; H04N 13/324; H04N 2213/001; H04N 2213/002
USPC ....................................... 348/51, 59
See application file for complete search history.

(56) References Cited

U.S. PATENT DOCUMENTS

| | | | |
|---|---|---|---|
| 5,801,794 A * | 9/1998 | Lehureau | H04N 9/3108 348/E9.027 |
| 6,771,028 B1 * | 8/2004 | Winters | G09G 3/3233 315/169.1 |

(Continued)

FOREIGN PATENT DOCUMENTS

| | | |
|---|---|---|
| KR | 10-2004-0094353 A | 11/2004 |
| KR | 10-1267899 B1 | 5/2013 |

*Primary Examiner* — James T Boylan
(74) *Attorney, Agent, or Firm* — Lewis Roca Rothgerber Christie LLP

(57) ABSTRACT

A stereoscopic image display panel includes a display panel including a unit pixel that includes pixels, where each of the pixels emits light based on a data signal, and a lens array including a lens that is located on the display panel in accordance with a location of the unit pixel. Each of the pixels includes a light-emitting element that is located near a center of an area of the unit pixel and a pixel driving circuit that drives the light-emitting element.

21 Claims, 14 Drawing Sheets

(51) Int. Cl.
*G09G 3/00* (2006.01)
*G09G 3/3233* (2016.01)
*G09G 3/3275* (2016.01)

(52) U.S. Cl.
CPC . *H04N 2213/001* (2013.01); *H04N 2213/002* (2013.01)

(56) References Cited

U.S. PATENT DOCUMENTS

| | | | | |
|---|---|---|---|---|
| 6,972,744 B1* | 12/2005 | Allio | ................. | G02B 27/2214 345/88 |
| 7,903,052 B2* | 3/2011 | Kwak | ................. | G09G 3/3233 315/169.1 |
| 8,179,336 B2* | 5/2012 | Hamer | .................... | G09G 3/20 345/1.3 |
| 2010/0091206 A1* | 4/2010 | Chapman | ........... | G02B 27/2214 349/15 |
| 2010/0238276 A1* | 9/2010 | Takagi | ............... | G02B 27/2214 348/54 |
| 2014/0098308 A1* | 4/2014 | Wu | .................... | G02B 27/2214 349/15 |
| 2014/0152640 A1* | 6/2014 | Chen | ...................... | G09G 3/003 345/212 |
| 2014/0240475 A1* | 8/2014 | Shigemura | ......... | G02B 27/2214 348/59 |
| 2015/0109549 A1* | 4/2015 | Gong | ................. | G02B 27/2214 349/15 |
| 2015/0243224 A1* | 8/2015 | Zhuang | ............. | G02F 1/13306 345/102 |
| 2016/0080729 A1* | 3/2016 | Watanabe | .............. | G03B 35/24 348/54 |
| 2016/0094836 A1 | 3/2016 | Kim et al. | | |
| 2016/0240593 A1* | 8/2016 | Gu | ....................... | G09G 3/3225 |
| 2016/0327692 A1* | 11/2016 | Gibilisco | ............. | G02B 3/0075 |
| 2017/0179210 A1* | 6/2017 | Kimura | ............... | H01L 27/3258 |

\* cited by examiner

DISPLAY PANEL, STEREOSCOPIC IMAGE DISPLAY PANEL, AND STEREOSCOPIC IMAGE DISPLAY DEVICE HAVING PIXEL LAYOUT BASED ON ARRANGEMENT OF LENS ARRAY TO BE USED THEREWITH

CROSS-REFERENCE TO RELATED APPLICATION

Korean Patent Application No. 10-2016-0137391, filed on Oct. 21, 2016, in the Korean Intellectual Property Office, and entitled: "Display Panel, Stereoscopic Image Display Panel, and Stereoscopic Image Display Device," is incorporated by reference herein in its entirety.

BACKGROUND

1. Field

Example embodiments relate generally to a display device. More particularly, embodiments relate to a display panel, a stereoscopic image display panel, and a stereoscopic image display device.

2. Description of the Related Art

A glass-free (or glassless) stereoscopic (or three-dimensional) image is an image having a 3D effect without using 3D glasses. To implement the glass-free stereoscopic image, a multi-view image including two or more images (e.g., 2D images) may be used, where a word 'multi-view' means views at various locations at which one object is viewed.

A stereoscopic image display device displays images having different views in different directions (i.e., the multi-view image) by using lenses and pixels corresponding to the lenses. In this case, a viewer (or user) can recognize the stereoscopic image by watching the images having different views in different directions (i.e., the multi-view image) based on binocular parallax.

As the stereoscopic image display device displays the multi-view image using the lenses, resolution of the stereoscopic image may be reduced, and crosstalk due to light output from pixels that a boundary between the lenses crosses may be caused.

SUMMARY

According to an aspect of example embodiments, a stereoscopic image display panel may include a display panel including a unit pixel that includes a plurality of pixels, each of the pixels emitting light based on a data signal, and a lens array including a lens that is located on the display panel in accordance with a location of the unit pixel. Here, the each of the pixels may include a light-emitting element located near a center of an area of the unit pixel, and a pixel driving circuit configured to drive the light-emitting element.

In example embodiments, the center of the area of the unit pixel may correspond to a center of an area of the lens.

In example embodiments, the unit pixel may include a first center corresponding to the center of the area of the unit pixel and a first region having an area that is smaller than the area of the unit pixel. In addition, the light-emitting element may be located in the first region.

In example embodiments, the unit pixel may include a second region that surrounds the first region. In addition, a pixel driving circuit of a first pixel that is adjacent to an edge of the unit pixel may be located in the second region.

In example embodiments, the pixel driving circuit may include a first transistor to transfer the data signal to a first node in response to a scan signal, a storage capacitor connected to the first node and to store the data signal, and a second transistor connected between a first power voltage and the light-emitting element, and to control a driving current flowing through the light-emitting element based on the data signal stored in the storage capacitor. Here, the pixel driving circuit may be located in the second region.

In example embodiments, the display panel may further include a scan-line to transfer the scan signal to the each of the pixels, a data-line to transfer the data signal to the each of the pixels, and a first power voltage line to transfer the first power voltage. Here, the scan-line, the data-line, and the first power voltage line may be arranged in the second region.

In example embodiments, the unit pixel may be symmetrical with respect to a first axis that passes through the center of the area of the unit pixel.

In example embodiments, the lens may have a hexagon plane-shape, and the lenses may be repeatedly arranged in directions that are perpendicular to sides of the hexagon plane-shape, respectively. In addition, the unit pixels may be repeatedly arranged in the directions.

In example embodiments, the pixels may be arranged at intersections between M pixel-rows and N pixel-columns, where M and N are integers greater than or equal to 2. In addition, a first pixel of an (M)th pixel-row of the M pixel-rows may have a pixel structure that is different from a pixel structure of an eleventh pixel, the eleventh pixel may be adjacent to the first pixel, and the eleventh pixel may be included in an (M+1)th pixel-row. Further, a second pixel of an (N)th pixel-column of the N pixel-columns may have a pixel structure that is different from a pixel structure of a twelfth pixel, the twelfth pixel may be adjacent to the second pixel, and the twelfth pixel may be included in an (N+1)th pixel-column.

In example embodiments, the pixels may be arranged at intersections between I pixel-rows and J pixel-columns, where I and J are integers greater than or equal to 3. In addition, the light-emitting elements of J pixels included in a first pixel-row of the I pixel-rows may be located adjacently to a second pixel-row, and the light-emitting elements of J pixels included in an (I)th pixel-row of the I pixel-rows may be located adjacently to an (I−1)th pixel-row. Further, the light-emitting elements of I pixels included in a first pixel-column of the J pixel-columns may be located adjacently to a second pixel-column, and the light-emitting elements of I pixels included in a (J)th pixel-column of the J pixel-columns may be located adjacently to an (J−1)th pixel-column.

In example embodiments, the first pixel-column may include at least one selected from a first-type pixel that emits first color and a third-type pixel that emits third color. In addition, the second pixel-column may include a second-type pixel that emits second color.

In example embodiments, the lenses may be repeatedly arranged in a third direction that is tilted at an acute angle with respect to the I pixel-rows, and the acute angle may be determined using [Equation 1] below, $$\tan\theta = 1/I, \text{ where } \theta \text{ denotes the acute angle.} \quad \text{[Equation 1]}$$

In example embodiments, the lens may have one of a circle plane-shape, a square plane-shape, and a rectangle plane-shape.

In example embodiments, the unit pixel may include i pixels in a first row, where i is an integer greater than or equal to 2. In addition, the unit pixel may include j pixels in a second row that is adjacent to the first row, where j is an integer greater than or equal to 2 and is different from i.

In example embodiments, one pixel included in the first row may be adjacent to two pixels included in the second row.

According to another aspect of example embodiments, a display panel may include a plurality of pixels configured to emit light based on a data signal. Here, the pixels may be grouped into pixel groups based on a first block. In addition, each of the pixels included in a first pixel group among the pixel groups may include a light-emitting element located near a center of an area of the first block, and a pixel driving circuit located adjacently to an edge of the first block and configured to drive the light-emitting element.

According to still another aspect of example embodiments, a stereoscopic image display device may include a data driver to generate a data signal based on image data, a display panel including a unit pixel that includes a plurality of pixels, each of the pixels emitting light based on the data signal, and a lens array including a lens that is located on the display panel in accordance with a location of the unit pixel. Here, the each of the pixels may include a light-emitting element located near a center of an area of the unit pixel, and a pixel driving circuit located adjacently to an edge of the unit pixel and configured to drive the light-emitting element.

In example embodiments, the lens array may be arranged at a focal distance of the lens from the display panel.

In example embodiments, N light output from N pixels included in the same pixel-row may pass through the lens to generate N views, where N is an integer greater than or equal to 2. In addition, at least two of the N views may be recognized by a viewer according to a location of the viewer.

In example embodiments, first light output from a first pixel of the N pixels may generate a first view, the first pixel may be located in a first direction with respect to a line-of-sight axis that passes through the lens, the light-of-sight being perpendicular to the display panel, and the first view may be generated in a second direction with respect to the line-of-sight.

In example embodiments, second light output from a second pixel of the N pixels may generate a second view, the second pixel may be located in the second direction with respect to the line-of-sight axis, and the second view may be generated in the first direction with respect to the line-of-sight.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
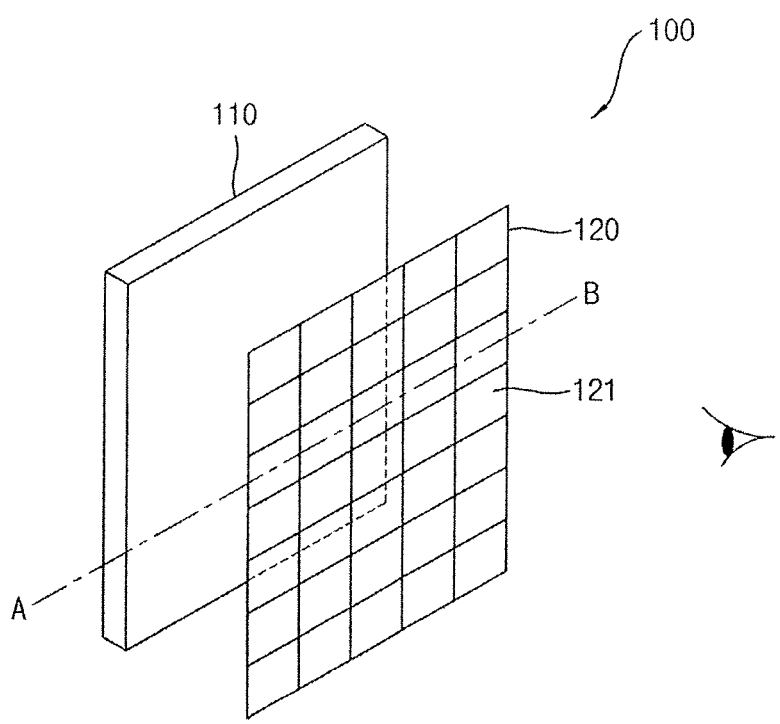
FIG. 1 illustrates a diagram of a stereoscopic image display panel according to example embodiments.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals refer to like elements throughout.

FIG. 1 is a diagram illustrating a stereoscopic image display panel according to example embodiments. Referring to FIG. 1, the stereoscopic image display panel 100 may include a display panel 110 and a lens array 120.

The display panel 110 may include a plurality of pixels that may be grouped into unit pixels (i.e., pixel groups) based on a first block. The first block may correspond to a lens 121. For example, the first block may have an identical or similar shape as the lens 121. In addition, the first block may have the same area as the lens 121. The pixels may emit light based on a data signal provided from an external component (e.g., a driving integrated circuit). A circuit structure of the pixel will be described below with reference to FIG. 4B.

The lens array 120 may include lenses 121 that correspond to the unit pixels, respectively. The lens array 120 may be placed on the display panel 110 (or, between a user and the display panel 110). The lens 121 may be a convex lens. The lens 121 may have a circle plane-shape, a square plane-shape, a rectangle plane-shape, a hexagon plane-shape, etc. For example, the lens 121 may be a lenticular lens. In the lens array 120, the lenses 121 may be arranged with a specific distance. The lenses 121 may be implemented by a film and, thus, may be coated on the display panel 110.

In an example embodiment, the lens array 120 may be a parallax barrier. In this case, the lens 121 may be an open space (or slit) between barriers.

The stereoscopic image display panel 100 may display, using the display panel 110 and the lens array 120, location information, direction information, and color information of light that the virtual object generates. That is, the stereoscopic image display panel 100 may display the stereoscopic image.

Figure 2A:
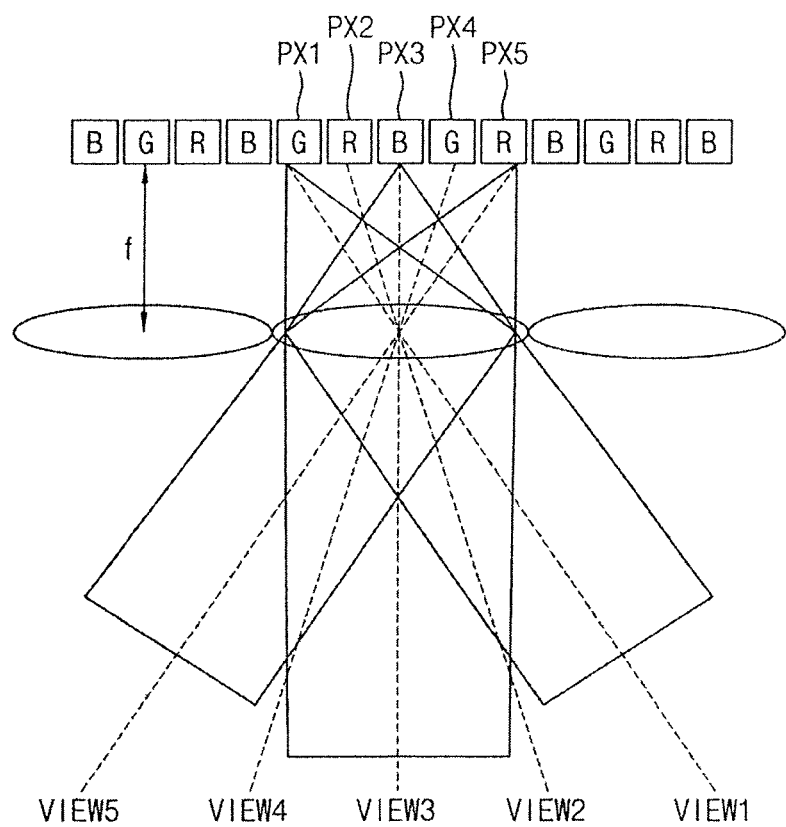
FIGS. 2A through 2C illustrate diagrams for describing how a stereoscopic image is displayed on the stereoscopic image display panel of FIG. 1.
Figure 2B:
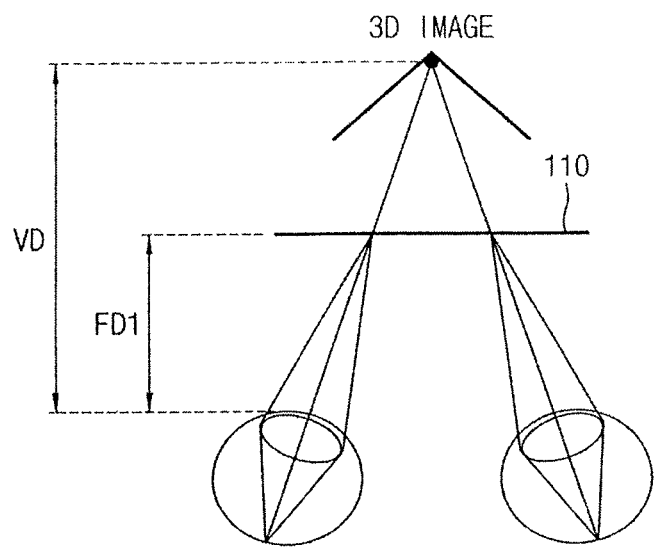
Figure 2C:
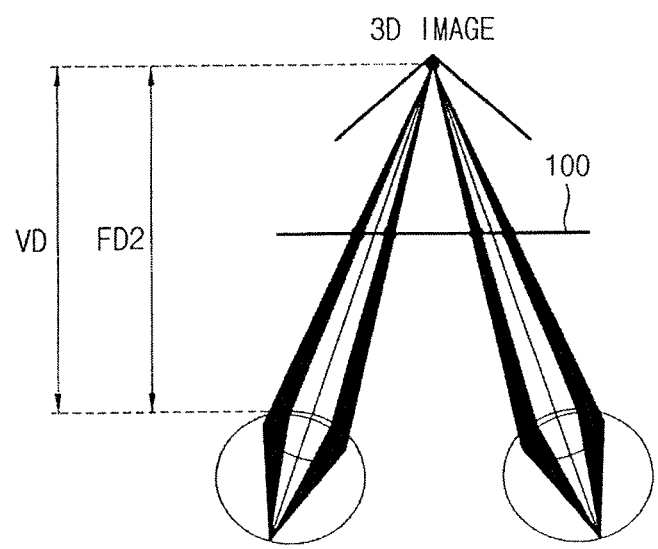

FIGS. 2A through 2C are diagrams for describing how a stereoscopic image is displayed on the stereoscopic image display panel of FIG. 1. Referring to FIGS. 2A through 2C, a cross section of the stereoscopic image display panel 100 of FIG. 1 taken along an A-B axis is shown.

As shown in FIG. 2A, first-type through third-type pixels R, G, and B may be repeatedly arranged on the A-B axis. The first-type through third-type pixels R, G, and B may emit different color light, and thus a color of the stereoscopic image may be implemented by combining first color light output from the first-type pixels R, second color light output from the second-type pixels G, and third color light output from the third-type pixels B. For example, the first color light output from the first-type pixels R may be red, the second color light output from the second-type pixels G may be green, and the third color light output from the third-type pixels B may be blue.

As illustrated in FIG. 2A, one unit pixel (i.e., one pixel group) may include five pixels PX1 through PX5, and one unit pixel may correspond to one lens 121. That is, one unit pixel including the five pixels PX1 through PX5 may be allocated (or, dedicated) to one lens 121. Although it is illustrated in FIG. 2A that the five pixels PX1 through PX5 are allocated to one lens 121, the number of pixels allocated to one lens 121 is not limited thereto. For example, more than five pixels may be allocated to one lens 121 as a size (or, pitch) of the lens 121 increases.

The lens 121 may be arranged at a distance from the unit pixel (or, the five pixels PX1 through PX5) on a line-of-sight axis of a viewer (e.g., an axis that is perpendicular to the display panel 110 and passes through a center of the lens 121). For example, the lens 121 may be arranged at a focal distance of the lens 121 from the unit pixel.

The pixels PX1 through PX5 may generate different views VIEW1 through VIEW5 (e.g., viewpoints located on a plane that is parallel to the display panel 110). The views VIEW1 through VIEW5 may be determined depending on a relative location between the lens 121 and the pixels PX1 through PX5.

For example, the first pixel PX1 may be to the left of the line-of-sight axis and the first view VIEW1 generated by the first pixel PX1 may be to the right of the line-of-sight axis. The first view VIEW1 may be a view in a direction corresponding to a first axis that passes through a center of the first pixel PX1 and the center of the lens 121.

Similarly, the second pixel PX2 may be to the left of the line-of-sight axis. The second pixel PX2 may be closer to the line-of-sight axis than the first pixel PX1. In this case, the second view VIEW2 generated by the second pixel PX2 may be to the right of the line-of-sight axis. The second view VIEW2 may be closer to the line-of-sight axis than the first view VIEW1. The second view VIEW2 may be a view in a direction corresponding to a second axis that passes through a center of the second pixel PX2 and the center of the lens 121.

The third pixel PX3 may be located on the line-of-sight axis and the third view VIEW3 generated by the third pixel PX3 may be located on the line-of-sight axis. The third view VIEW3 may be a view in a direction corresponding to the line-of-sight axis (i.e., a view in a direction corresponding to a third axis that passes through a center of the third pixel PX3 and the center of the lens 121).

The fourth pixel PX4 may be to the right of the line-of-sight axis and the fourth view VIEW4 generated by the fourth pixel PX4 may be to left of the line-of-sight axis. The fourth view VIEW4 may be a view in a direction corresponding to a fourth axis that passes through a center of the fourth pixel PX4 and the center of the lens 121.

Similarly, the fifth pixel PX5 may be to the right of the line-of-sight axis. The fifth pixel PX5 may be closer to the line-of-sight axis than the fourth pixel PX4. In this case, the fifth view VIEW5 generated by the fifth pixel PX5 may be to the left of the line-of-sight axis. The fifth view VIEW5 may be farther from the line-of-sight axis than the fourth view VIEW4. The fifth view VIEW5 may be a view in a direction corresponding to a fifth axis that passes through a center of the fifth pixel PX5 and the center of the lens 121.

In some example embodiments, a distance between adjacent ones of the views VIEW1 through VIEW5 may be less than a specific distance. For example, on a plane that is apart from the stereoscopic image display panel 100 and parallel to the stereoscopic image display panel 100 (e.g., a plane on which both eyes of the viewer are located), the distance between adjacent ones of the views VIEW1 through VIEW5 may be less than a specific distance between 3 mm and 4 mm, where the specific distance is an average size of pupil of the eye of the viewer. Meanwhile, more pixels may be required to generate sufficient views. In this case, resolution of the stereoscopic image may be degraded (or decreased) in inverse proportion to the number of the pixels.

Since light-emitting elements are densely located in a specific region (e.g., a region corresponding to the center of the lens 121) in the stereoscopic image display panel 100, the stereoscopic image display panel 100 may generate sufficient views using less pixels. Thus, the resolution of the stereoscopic image may be relatively improved. This will be described below with reference to FIGS. 4A and 4B.

Referring to FIG. 2B, a conventional display device using 3D glasses may display a left-eye image (i.e., an image corresponding to a left eye of the viewer) and a right-eye image (i.e., an image corresponding to a right eye of the viewer) on the display panel 110. In this case, a focal point of the viewer may be placed on the display panel 110 on which the images are displayed. However, a virtual object (or 3D image) may be formed at a point that is apart from the display panel 110 by binocular parallax. In other words, a first focal distance FD1 may be inconsistent with a convergence distance VD (e.g., a distance between the virtual object and the eye of the viewer). The inconsistency between the first focal distance FD1 and the convergence distance VD may result in eye-strain of the viewer.

Referring to FIG. 2C, two or more images (or views) that the stereoscopic image display panel 100 displays may enter eyeball (e.g., both eyes) of the viewer, and a focal point of the viewer (i.e., accommodation of the eyeball) may be adjusted based on a depth of the virtual object (or 3D image) implemented by the two or more images. Thus, a second focal distance FD2 may be consistent with the convergence distance VD, and thus the eye-strain of the viewer may be alleviated (or reduced).

As described above with reference to FIGS. 1, 2A, and 2C, the stereoscopic image display panel 100 may generate the views VIEW1 through VIEW5 using the pixels PX1 through PX5 and the lens 121. In this case, since the two or more images (or views) enter the eyeball (e.g., both eyes) of the viewer, the viewer can recognize the virtual object in three dimensions.

In example embodiments, each of the pixels included in the unit pixel may include the light-emitting element (or, light-emitting region) that is located in a specific region (e.g., a region corresponding to the center of the lens 121 or a region corresponding to a center of an area of the unit pixel). In this case, a pixel driving circuit that drives the light-emitting element may be located in an edge region of the unit pixel. That is, the light-emitting elements of the pixels may be clustered in a specific region of the unit pixel, and the pixel driving circuit may be located outside the specific region of the unit pixel.

Figure 3A:
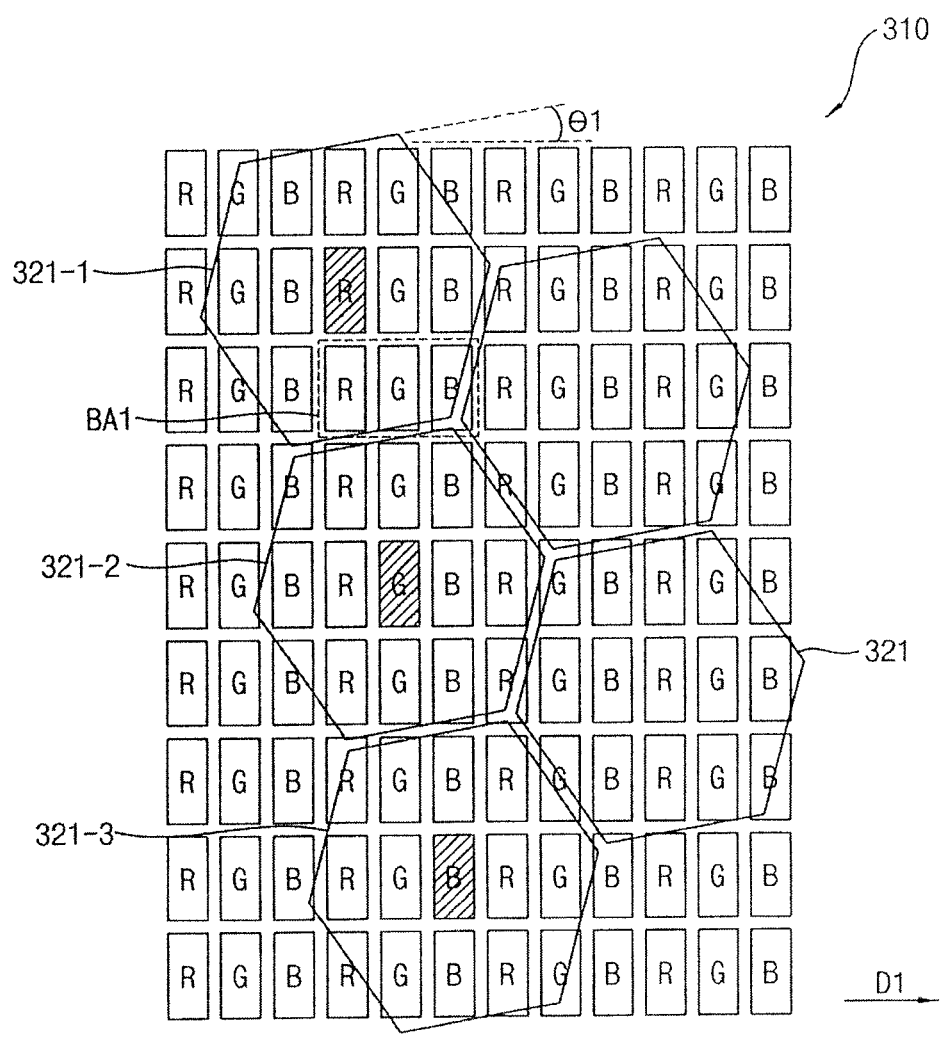
FIGS. 3A and 3B illustrate diagrams of comparative examples of the stereoscopic image display panel of FIG. 1.
Figure 3B:
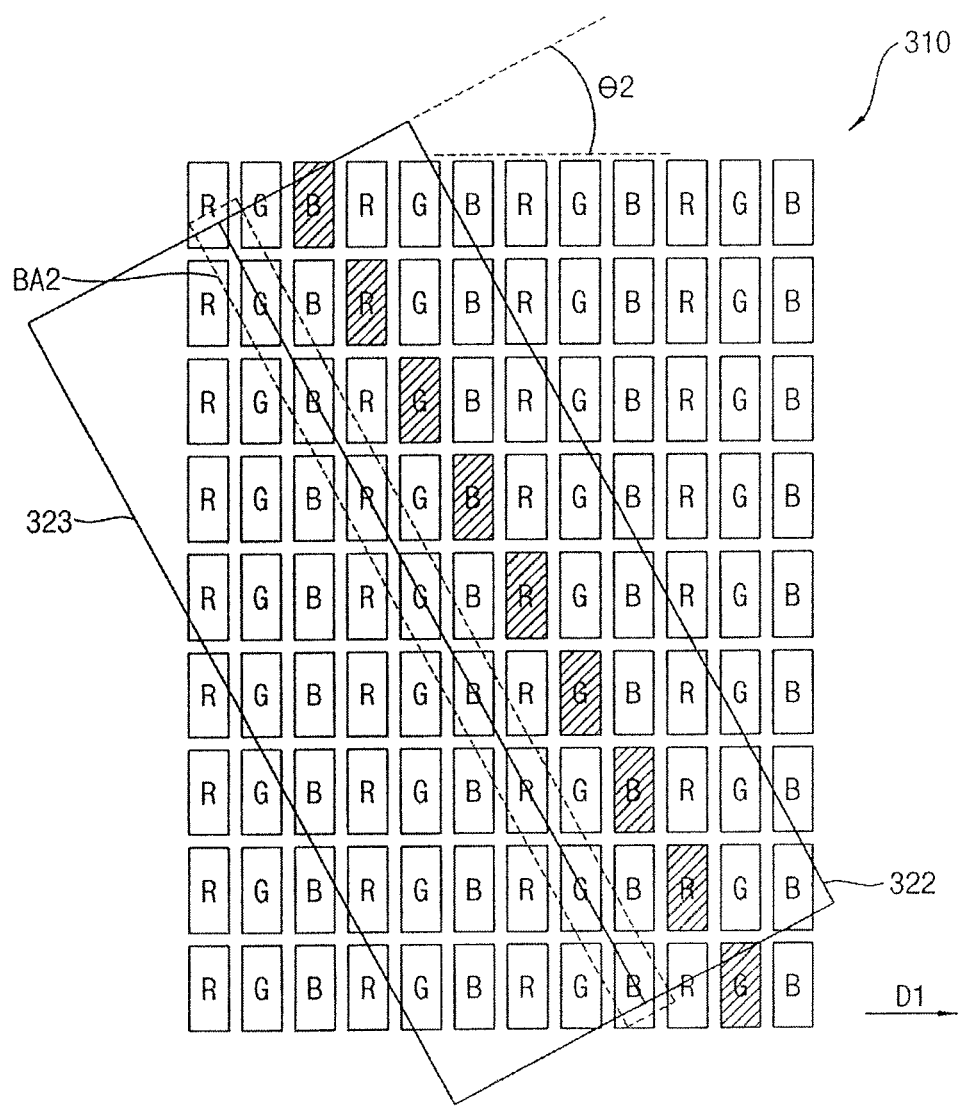

FIGS. 3A and 3B are diagrams illustrating comparative examples of the stereoscopic image display panel of FIG. 1.

Referring to FIG. 3A, the display panel 310 may include first-type pixels R, second-type pixels G, and third-type pixels B, where the first-type through third-type pixels R, G, and B are repeatedly arranged in a first direction D1.

The lens 321 may have a hexagon plane-shape. The lenses 321 may be repeatedly arranged in a second direction to implement a color of the stereoscopic image. Here, the second direction may be tilted at a first angle θ1 with respect to the first direction D1.

In this case, the first-type pixel R corresponding to the first lens 321-1, the first-type pixel R corresponding to a center of the first lens 321-1, the second-type pixel G corresponding to the second lens 321-2, and the third-type pixel B corresponding to the third lens 321-3 may generate the same view. Thus, a color of the stereoscopic image may be implemented based on first color light output from the first-type pixel R corresponding to the first lens 321-1, second color light output from the second-type pixel G corresponding to the second lens 321-2, and third color light output from the third-type pixel B corresponding to the third lens 321-3.

However, since the lenses 321 are aligned in the second direction, some pixels may be allocated to two or more lenses. For example, the first-type pixel R and the second-type pixel G included in a first boundary region BA1 may be allocated to the first lens 321-1 and the second lens 321-2, and the third-type pixel B included in the first boundary region BA1 may be allocated to the first lens 321-1, the second lens 321-2, and the fourth lens (e.g., a lens that is adjacent to the first lens 321-1 and the second lens 321-2). In this case, the light output from the first-type pixel R included in the first boundary region BA1 may generate different views because the light output from the first-type pixel R included in the first boundary region BA1 is divided (or, separated) via the first lens 321-1 and the second lens 321-2. For example, with reference to the views VIEW1 through VIEW5 illustrated in FIG. 2A, the first-type pixel R included in the first boundary region BA1 may generate a view that is located at a right-upper side of the first lens 321-1 and a view that is located at a left-lower side of the lines 321-2.

That is, crosstalk may be caused because an image required to be viewed at the right-upper side of the first lens 321-1 is also viewed at the left-lower side of the second lens 321-2. If the pixels included in the first boundary region BA I are not used in order to prevent crosstalk, the resolution of the stereoscopic image as well as the number of views may be reduced.

Although it is illustrated in FIG. 3A that the lens 321 has the hexagon plane-shape, the lens 321 may have other plane-shapes, e.g., a circle plane-shape, a square plane-shape, a rectangle plane-shape, etc. In all cases, however, crosstalk due to light output from the pixels that the boundary between the lenses 321 crosses may be caused.

Referring to FIG. 3B, the lens 322 may have a rectangle plane-shape. Here, the lens 322 may be a longitudinal-shape lens (or lenticular lens). Similar to lenses 321 described with reference to FIG. 3A, the lenses 322 may be repeatedly arranged in a specific direction to implement a color of the stereoscopic image. Here, the specific direction may be tilted at a second angle θ2 with respect to the first direction D1. In this case, the first-type pixel R, the second-type pixel G, and the third-type pixel B corresponding to a central axis of the lens 322 may generate the same view.

Here, the first-type pixel R, the second-type pixel G, and the third-type pixel B included in a second boundary region BA2 may be allocated to a lens 322 and adjacent lens 323 (e.g., a lens that is arranged in a left direction of the lens 322). In addition, light output from the pixels included in the second boundary region BA2 may generate a view that is located at a right side of the lens 322 and a view that is located at a left side of the adjacent lens 323. That is, the crosstalk may be caused because an image required to be viewed at the right side of the lens 322 is also viewed at the left side of the adjacent lens 323.

In contrast, the stereoscopic image display panel 100 may include the unit pixel (or clustered pixel), and the unit pixel may include the light-emitting elements (or light-emitting regions) that are densely located in a specific region. For example, the light-emitting elements may be densely located in a central region of the unit pixel. In this case, the light output from the pixels (or the light-emitting elements) may pass through only one lens (e.g., a lens corresponding to the unit pixel). Thus, crosstalk due to divided light may be prevented. In addition, since all pixels including the pixels that a boundary between the lenses crosses are used, the resolution of the stereoscopic image, as well as the number of views, may be relatively increased. Further, since the clustered emitting-light elements generate sufficient views (e.g., a distance between adjacent ones of the views is less than a specific distance between 3 mm and 4 mm), the number of pixels allocated (or required) to one lens may be reduced. Thus, the resolution of the stereoscopic image may be improved (or increased) in inverse proportion to the reduced number of the pixels.

Figure 4A:
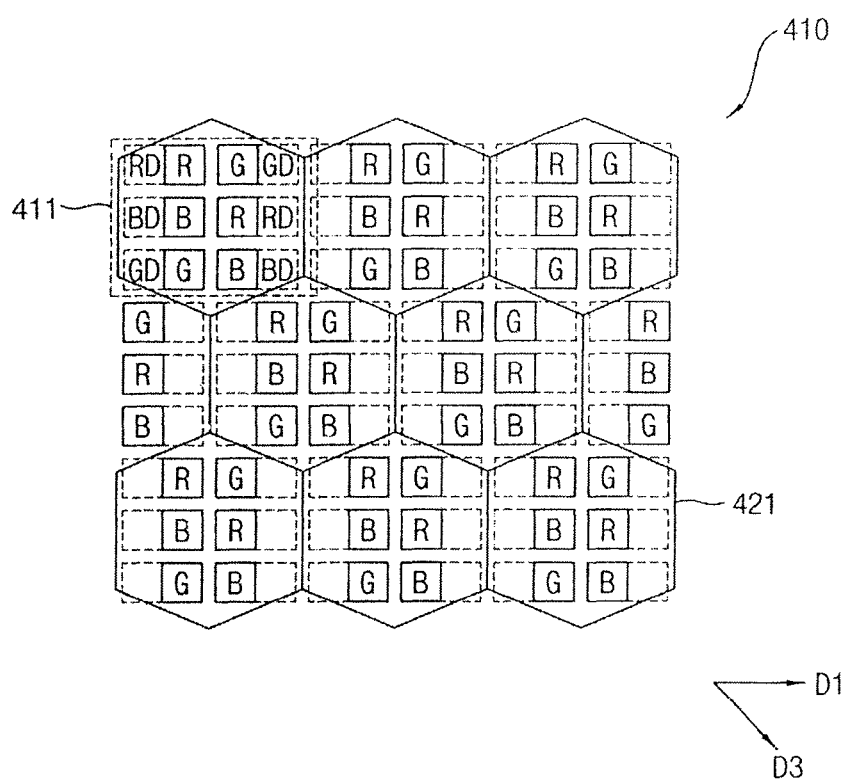
FIG. 4A illustrates a diagram of an example of the stereoscopic image display panel of FIG. 1.
Figure 4B:
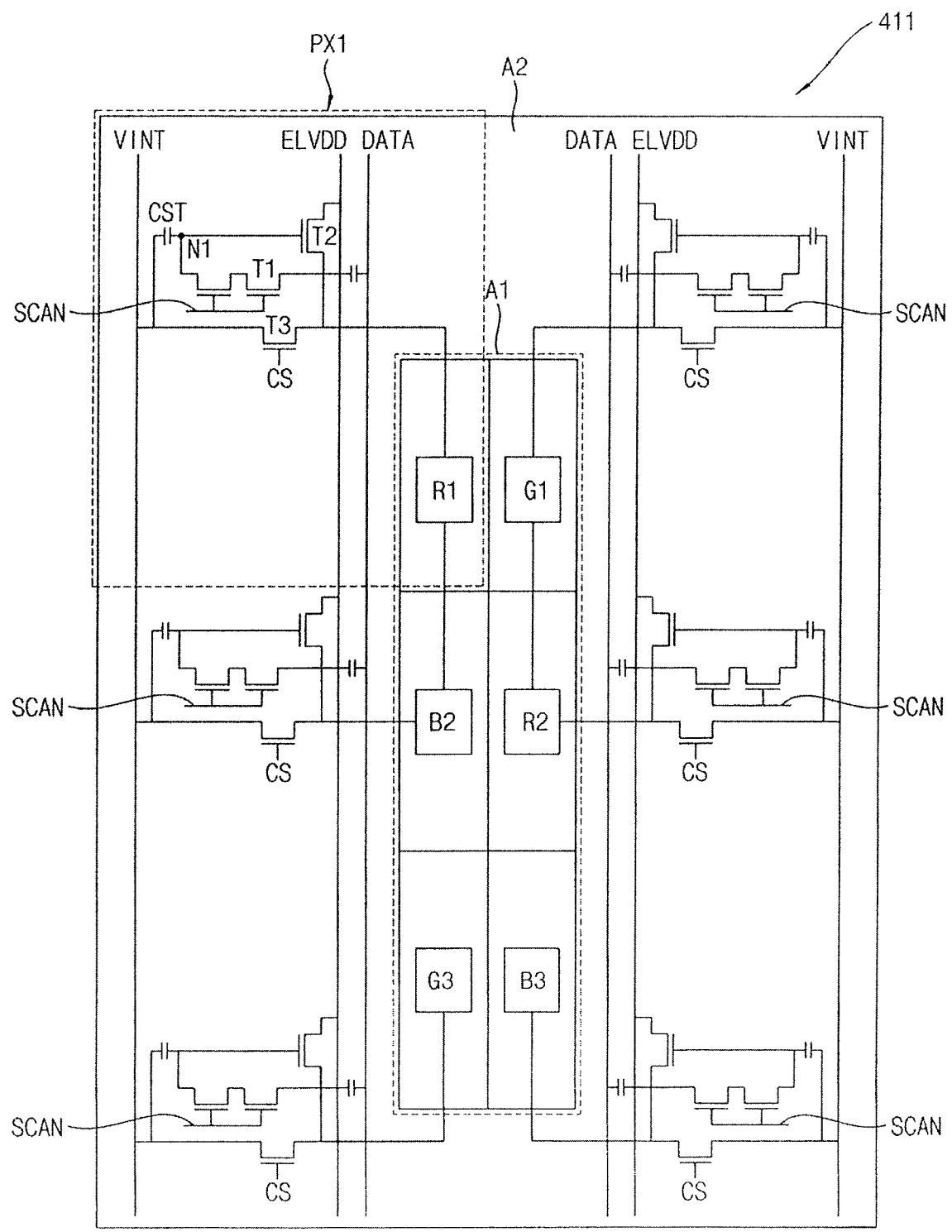
FIG. 4B illustrates a circuit diagram of an example of a unit pixel included in the stereoscopic image display panel of FIG. 4A.

FIG. 4A is a diagram illustrating an example of the stereoscopic image display panel of FIG. 1. FIG. 4B is a circuit diagram illustrating an example of a unit pixel included in the stereoscopic image display panel of FIG. 4A.

Referring to FIG. 4A, the display panel 410 may include pixels (e.g., first-type through third-type pixels R, G, and B) that are repeatedly arranged in a first direction D1 (or in a direction perpendicular to the first direction D1).

The lens 421 may have a hexagon plane-shape. The lenses 421 may be repeatedly arranged in directions (e.g., the first direction D1 and a third direction D3) that are perpendicular to sides of the hexagon plane-shape, respectively.

The unit pixels 411 may be repeatedly arranged in the directions (e.g., the first direction D1 and the third direction D3) in accordance with respective locations of the lenses 421. Hereinafter, it will be assumed that the unit pixel 411 includes six pixels.

As illustrated in FIG. 4B, the unit pixel 411 may include a first region A1 and a second region A2. For example, the first region A1 may include a first center corresponding to a center of an area of the unit pixel 411 (or a center of an area of the lens 421) and may have an area that is smaller than an area of the unit pixel 411. For example, the unit pixel 411 may be 40 μm×40 μm and the first region A1 may be 14 μm×21 μm. The second region A2 may surround (or enclose) the first region A1. For example, the second region A2 may include the first center (i.e., a center that is identical to the center of the area of the unit pixel 411).

The light-emitting elements R1, G1, B2, R2, G3, and B3 of the pixels may be located in the first region A1. For example, the light-emitting elements R1, G1, B2, R2, G3, and B3 may be organic light-emitting diodes. The light-emitting elements R1, G1, B2, R2, G3, and B3 may be arranged adjacently to each other. For example, the light-emitting elements R1, G1, B2, R2, G3, and B3 may be optically adjacent to each other. The pixel driving circuits RD, BD, GD of the pixels may be located in the second region A2.

Each of the pixel driving circuits RD, BD, GD (or each of the pixels) may include a first transistor T1, a storage capacitor CST, and a second transistor T2. For example, the first pixel PX1 may include the first transistor T1, the storage capacitor CST, and the second transistor T2. The first transistor T1 may transfer image data DATA (e.g., a data signal provided from a driving integrated circuit) to a first node N1 in response to a scan signal SCAN provided from an external component (e.g., the driving integrated circuit). The storage capacitor CST may be connected between the first node N1 and a third power voltage VINT. The storage capacitor CST may store the data signal DATA. The second transistor T2 may be connected between the first power voltage ELVDD and the light-emitting element (i.e., indicated by R1, G1, B2, R2, G3, and B3). The second transistor T2 may control (or adjust) a driving current flowing through the light-emitting element in response to the data signal DATA stored in the storage capacitor CST. The light-emitting element may emit light with luminance corresponding to the driving current.

In addition, each of the pixel driving circuits may further include a third transistor T3. The third transistor T3 may connect an anode of the light-emitting element to the third power voltage VINT in response to a control signal CS (or the scan signal). In this case, the light-emitting element may not emit light (or may stand by until the data signal DATA is written) based on the third power voltage VINT. In some example embodiments, a voltage relating to characteristics of the light-emitting element (e.g., a voltage between the anode and a cathode of the light-emitting element) may be output to an external component via a third power voltage line that transfers the third power voltage VINT.

In brief, each of the pixel driving circuits RB, BD, GD may include the first transistor T1, the storage capacitor CST, the second transistor T2, etc., to control the light-emitting element to emit light.

As illustrated in FIG. 4B, the pixel 411 (or the display panel 410) may further include a scan-line, a data-line, a first power voltage line, and a third power voltage line. Here, the scan-line may transfer the scan signal SCAN to the pixel, the data-line may transfer the data signal DATA to the pixel, the first power voltage line may transfer the first power voltage ELVDD, and the third power voltage line may transfer the third power voltage VINT. As shown, the data-line, the first power voltage line, and the third power voltage line may extend in the second direction orthogonal to the first direction (e.g., a vertical direction). Here, the data-line, the first power voltage line, and the third power voltage line may be arranged in the second region A2. As shown, the scan-line may extend in the first direction D1 to provide the scan signal SCAN to the pixels included in the same pixel-row. Here, the scan-line may be arranged in the second region A2.

In an example embodiment, the unit pixel 411 may be symmetrical with respect to a first axis that passes through the center of the area of the unit pixel 411. For example, the unit pixel 411 may be symmetrical vertically with respect to a vertical axis that extends along a boundary between the first light-emitting element R1 and the second light-emitting element G1. The light-emitting elements R1, G1, B2, R2, G3, and B3 are densely located in the first region A1. The pixel driving circuits may be located in the second region A2. Thus, the unit pixel 411 may be symmetrical with respect to the first axis (e.g., a horizontal axis, a vertical axis, a diagonal axis) that passes through the center of the area of the unit pixel 411.

In example embodiments, the pixels included in the unit pixel 411 may be arranged at intersections between M pixel-rows and N pixel-columns, where M and N are integers greater than or equal to 2. In this case, the first pixel included in the (M)th pixel-row of the M pixel-rows may have a pixel structure that is different from a pixel structure of the eleventh pixel. Here, the eleventh pixel may be adjacent to the first pixel and may be included in the (M+1)th pixel-row. Similarly, the second pixel included in the (N)th pixel-column of the N pixel-columns may have a pixel structure that is different from a pixel structure of the twelfth pixel. Here, the twelfth pixel may be adjacent to the second pixel and may be included in the (N+1)th pixel-column.

Referring back to FIG. 4A, the unit pixel 411 may be arranged at intersections between the first through third pixel-rows and the first and second pixel-columns. In this case, a pixel structure of the third-type pixel B included in the third pixel-row (or, located at an intersection of the third pixel-row and the second pixel-column) may be different from a pixel structure of the first-type pixel R included in the fourth pixel-row. For example, the light-emitting element of the third-type pixel B of the third pixel-row may be located in a direction (or a left direction) that is opposite to the first direction D1, and the light-emitting element of the first-type pixel R of the fourth pixel-row may be located in the first direction D1.

Similarly, a pixel structure of the third-type pixel B included in the second pixel-column (or located at an intersection of the second pixel-column and the third pixel-row) may be different from a pixel structure of the second-type pixel G included in the third pixel-column. For example, the light-emitting element of the second-type pixel G of the third pixel-column may be located in the first direction D1.

That is, as the display panel 410 includes the first-type through third-type pixels R, G, and B that are repeatedly arranged in the first direction D1 or in the direction perpendicular to the first direction D1, respective locations of the light-emitting elements of the pixels R, G, and B in the same pixel-row may alternate (e.g., in the order of 'left side', 'right side', 'left side', 'right side', . . . ) per each pixel. In addition, respective locations of the light-emitting elements of the pixels R, G, and B in the same pixel-column may alternate (e.g., in the order of 'left side', 'right side', 'left side', 'right side', . . . ) per three pixels. Further, different pixels have different arrangements for light emitting elements and drivers in accordance with centering the light emitting elements, e.g., the unit pixel 411 may have three pixels with the light emitting elements in the right side and the driver in the left side and three pixels with the light emitting elements in the left side and the driver in the right side.

Although it is illustrated in FIGS. 4A and 4B that the lens 421 has the hexagon plane-shape and the unit pixel 411 includes six pixels, embodiments are not limited thereto. For example, the lens 421 may have a quadrangle (i.e., square or rectangle) plane-shape, a circle plane-shape, etc., and the unit pixel 411 may include five or less pixels or seven or more pixels.

Figure 4C:
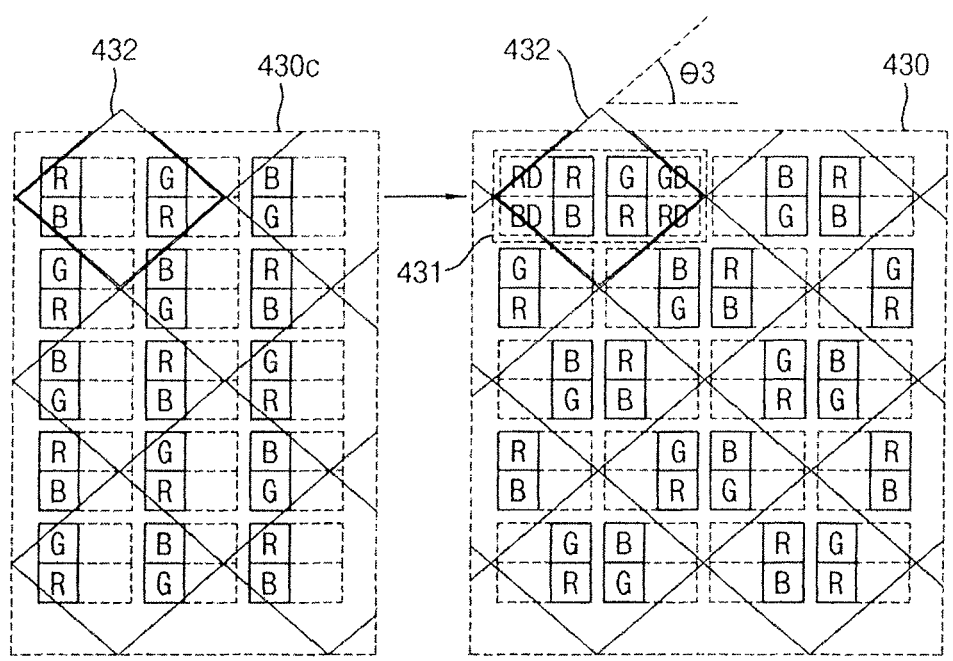
FIGS. 4C and 4D illustrate diagrams of an example of the stereoscopic image display panel of FIG. 1.
Figure 4D:
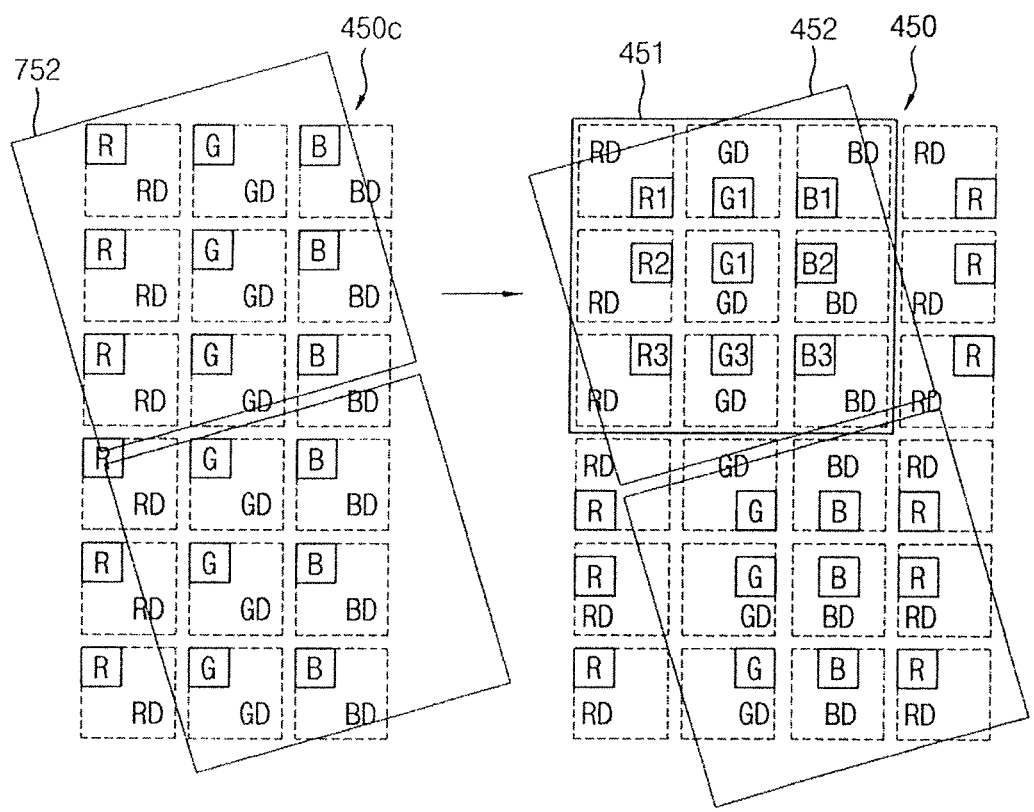

FIGS. 4C and 4D are diagrams illustrating an example of the stereoscopic image display panel of FIG. 1 compared to conventional display panels.

Referring to FIG. 4C, a conventional display panel 430c may include pixels each having a light-emitting element located in a specific direction (e.g., a left direction), such that the arrangement of the light emitting element and the driver therefor are the same for all pixels. The lens 432 may have a quadrangle plane-shape. The lens 432 may be arranged along a specific direction that is tilted at a specific angle (e.g., a third angle θ3) with respect to a row direction to implement a color of the stereoscopic image. In this case, four pixels may be allocated to one lens 432, but the light-emitting elements of the four pixels may be divided by the lens 432.

In contrast, a display panel 430 may include a second unit pixel 431, and the pixels included in the second unit pixel 431 may include the light-emitting elements that are located near a center of an area of the second unit pixel 431. In particular, different pixels have different arrangements for light emitting elements and drivers in accordance with centering the light emitting elements, e.g., the unit pixel 431 may have two pixels with the light emitting elements in the right side and the driver in the left side and two pixels with the light emitting elements in the left side and the driver in the right side. Thus, as illustrated in FIG. 4C, the light-emitting elements may be allocated to only one lens 432.

Referring to FIG. 4D, a conventional display panel 450c may include pixels each having a light-emitting element that is located in a specific direction (e.g., a left-upper direction), such that the arrangement of the light emitting element and the driver therefor are the same for all pixels. The lens 452 may have a quadrangle plane-shape. The lens 452 may be arranged along a specific direction that is tilted at a specific angle with respect to a row direction to implement a color of the stereoscopic image. In this case, nine pixels may be allocated to one lens 452, but the light-emitting elements of some pixels (e.g., the third-type pixel B of the first row and the first-type pixel R of the fourth row) may be divided by the lens 452.

In contrast, the display panel 450 may include a third unit pixel 451, and the pixels included in the third unit pixel 451 may include the light-emitting elements R1 through R3, G1 through G3, and B1 through B3 that are located near a center of an area of the third unit pixel 451 (or in a central region of the third unit pixel 451). In particular, different pixels have different arrangements for light emitting elements and drivers in accordance with centering the light emitting elements.

For example, the first-type pixels included in the third unit pixel 451 may include the light-emitting elements R1, R2, and R3 that are located near respective right sides of the third-type pixels, and the third-type pixels included in the third unit pixel 451 may include the light-emitting elements B1, B2, and B3 that are located near respective left sides of the third-type pixels. In addition, the second-type pixels included in the third unit pixel 451 may include the light-emitting elements G1, G2, and G3 that are located at respective horizontal centers of the second-type pixels or at any locations in the second-type pixels. The central region in which the light-emitting elements R1 through R3. G1 through G3, and B1 through B3 are located may be determined by the pixels that are located near an edge of the third unit pixel 451. Thus, the light-emitting elements of the pixels located in the central region may be located at any locations in the pixels located in the central region.

For example, the pixels of the first row included in the third unit pixel 451 may include the light-emitting elements R1, G1, and B1 that are located near respective lower sides of the pixels, and the pixels of the third row included in the third unit pixel 451 may include the light-emitting elements R3, G3, and B3 that are located near respective upper sides of the pixels. In addition, the pixels of the second row included in the third unit pixel 451 may include the light-emitting elements R2, G2, and B2 that are located at respective vertical centers of the pixels or at any locations in the pixels.

In other words, when the pixels included in the unit pixel are located at intersections between I pixel-rows and J pixel-columns, where I and J are integers greater than or equal to 3, the light-emitting elements included in J pixels of the first pixel-row of the I pixel-rows may be located adjacently to the second pixel-row, the light-emitting elements included in J pixels of the (I)th pixel-row of the I pixel-rows may be located adjacently to the (I−1)th pixel-row, the light-emitting elements included in I pixels of the first pixel-column of the J pixel-columns may be located adjacently to the second pixel-column, and the light-emitting elements included in I pixels of the (J)th pixel-column of the J pixel-columns may be located adjacently to the (J−1)th pixel-column.

In example embodiments, when the pixels included in the unit pixel are located at intersections between I pixel-rows and J pixel-columns (i.e., when the unit pixel includes I×J pixels), the lenses and the unit pixels may be repeatedly arranged in a third direction that is tilted at an acute angle with respect to the pixel-row or the pixel-column. Here, the acute angle may be determined using [Equation 1] below, $$\tan \theta = 1/I, \text{ where } \theta \text{ denotes the acute angle.} \quad \text{[Equation 1]}$$

For example, since the third unit pixel 451 illustrated in FIG. 4D includes 3×3 pixels, the third unit pixels 451 and the lenses 452 may be repeatedly arranged in a direction that is tilted at an angle of $\tan^{-1}(1/3)$ with respect to the pixel-row.

For example, since the second unit pixel 431 illustrated in FIG. 4C includes 2×2 pixels, the second unit pixels 431 and the lenses 432 may be repeatedly arranged in a direction that is tilted at an angle of $\tan^{-1}(1/2)$ with respect to the pixel-row. That is, the third angle θ3 may be $\tan^{-1}(1/2)$.

For example, since the first unit pixel 411 illustrated in FIG. 4A includes 3×2 pixels, the first unit pixels 411 and the lenses 421 may be repeatedly arranged in a direction that is tilted at an angle of $\tan^{-1}(1/2)$ with respect to the pixel-row.

As described above with reference to FIGS. 4A through 4D, the stereoscopic image display panel 100 may include the unit pixel, and the unit pixel may include the light-emitting elements that are densely located in a specific region (e.g., a region corresponding to a center of an area of the unit pixel). In this case, light output from the light-emitting elements may pass through only one lens. Thus, crosstalk due to divided light may be prevented, and the resolution of the stereoscopic image may be relatively improved.

FIGS. 5A through 5D are diagrams illustrating various examples of the stereoscopic image display panel of FIG. 1.

Figure 5A:
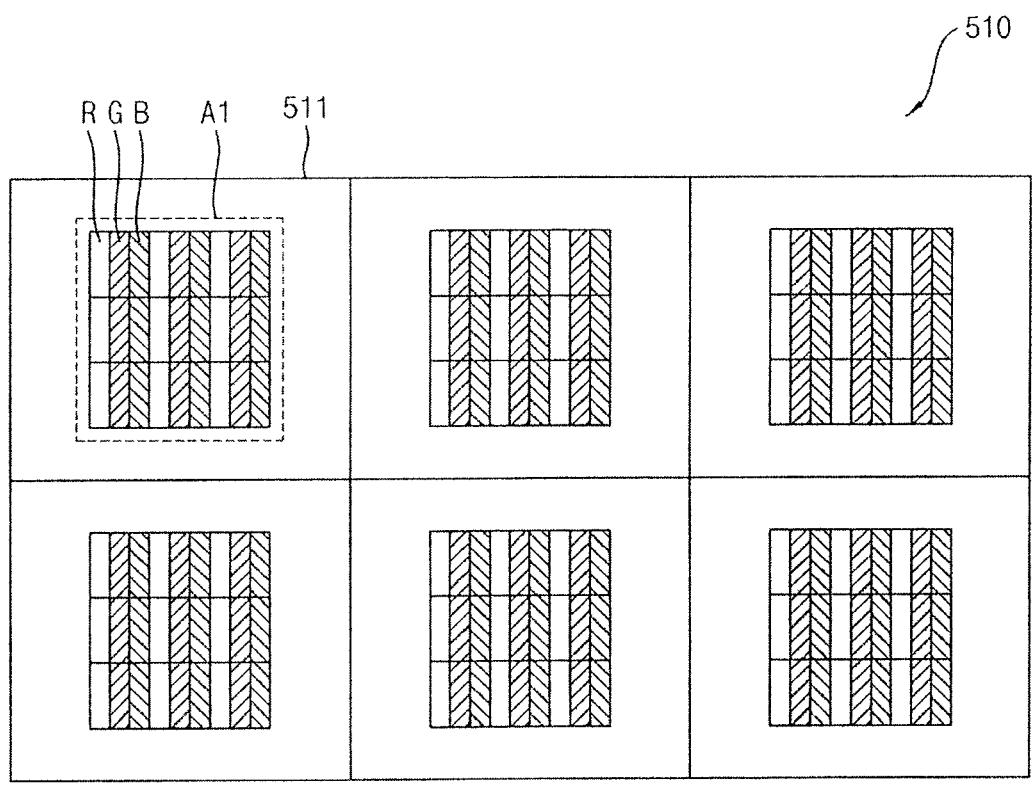
FIGS. 5A through 5D illustrate diagrams of various examples of the stereoscopic image display panel of FIG. 1.

Referring to FIG. 5A, the stereoscopic image display panel may include the lens array including the lens having a quadrangle plane-shape. The display panel 510 including the unit pixel 511 having a quadrangle shape. The unit pixel 511 may include 3×10 pixels R, G, and B. The light-emitting elements of the pixels R, G, and B may be located in a first region A1 (or a central region having the quadrangle shape) of the unit pixel 511. The unit pixels 511 may be repeatedly arranged in column and row directions.

Figure 5B:
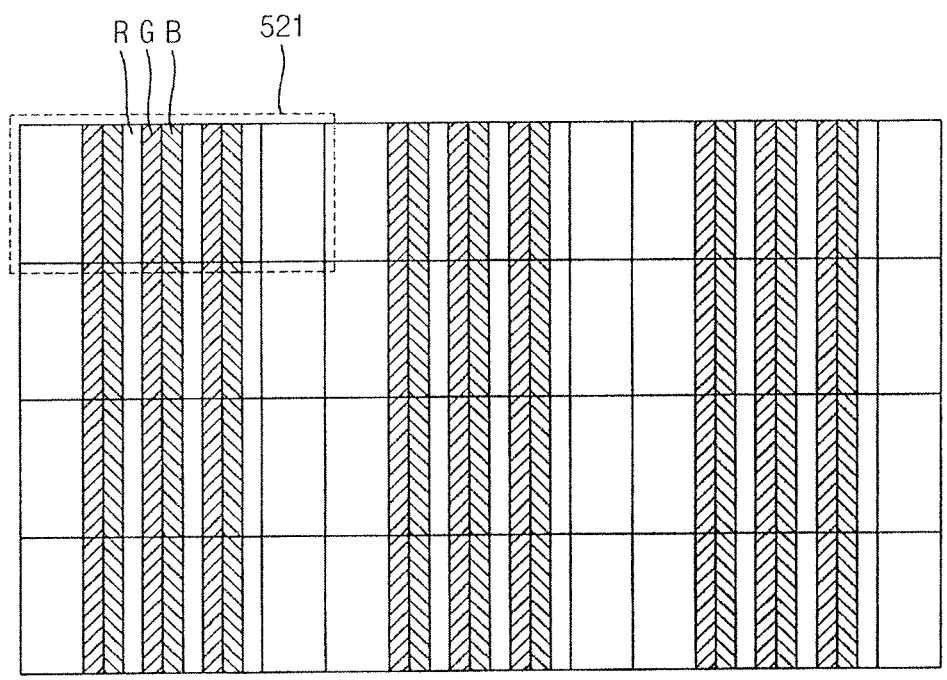

Referring to FIG. 5B, the stereoscopic image display panel may include the lens array including the longitudinal-shape lens (or lenticular lens). The unit pixel 521 may include 8 (or n×8, where n is a positive integer) pixels R, G, and B. The light-emitting elements of the pixels R, G, and B may be located in a central region of the unit pixel 521. The pixels R, G, and B (or light output from the pixels R, G, and B) located at a boundary between adjacent ones in an upper-lower direction among the unit pixels may, not be divided according to a shape of the lens. Thus, the light-emitting elements of the pixels R, G, and B may be densely located toward a horizontal axis. That is, the light-emitting elements of the pixels R, G, and B may be arranged along the horizontal axis.

Figure 5C:
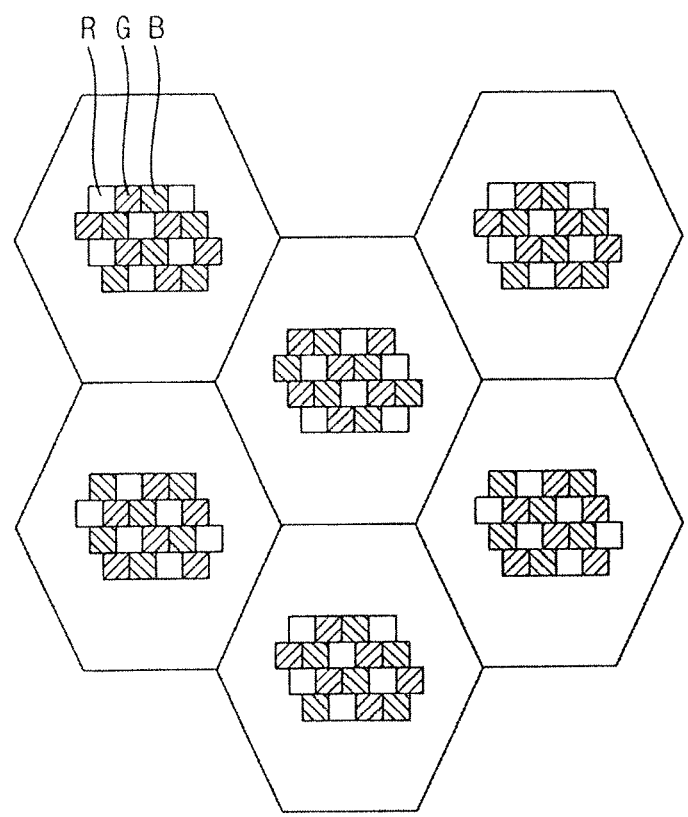

Referring to FIG. 5C, the stereoscopic image display panel may include the lens array including the lens having the hexagon plane-shape. The unit pixel may include 18 (e.g., 4+5+5+4) pixels R, G, and B. The light-emitting elements of the pixels R, G, and B may be apart from an edge of the lens. The light-emitting elements of the pixels R, G, and B may be located in a central region of a shape that is similar to a shape of the lens.

In an example embodiment, the unit pixel may include i pixels in a first row, where i is an integer greater than or equal to 2 and j pixels in a second row that is adjacent to the first row, where j is an integer greater than or equal to 2 and j is different from i. As illustrated in FIG. 5C, in the unit pixel, four pixels may be located in the first row, and five pixels may be located in the second row.

In an example embodiment, a first pixel included in the first row may be adjacent to two second pixels included in the second row. In other words, j pixels of the second row may be arranged in a staggered manner with respect to i pixels of the first row. For example, the second pixel of the second row may be shifted in a row direction by a half of one pixel, with respect to the first pixel of the first row that is adjacent to the second pixel of the second row.

Figure 5D:
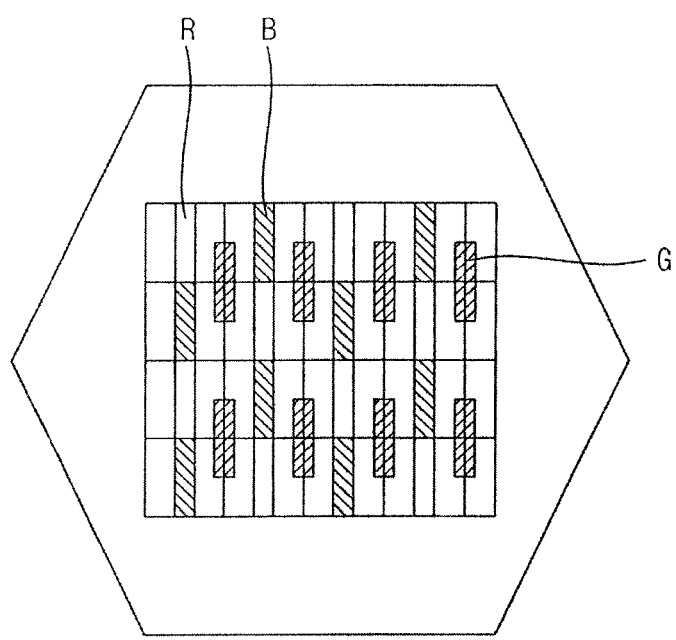

Referring to FIG. 5D, the stereoscopic image display panel may include the lens array including the lens having the hexagon plane-shape. The light-emitting elements of the pixels R, G, and B may be apart from an edge of the lens. The light-emitting elements of the pixels R, G, and B may be located in a central region of a quadrangle shape that is different from a shape of the lens.

In an example embodiment, the unit pixel may include the pixels (or, the light-emitting elements) that are arranged in a pentile manner. For example, in the unit pixel, a set of the first-type pixel R (or the light-emitting element of the first-type pixel R), the second-type pixel G (or the light-emitting element of the second-type pixel G), the third-type pixel B (or the light-emitting element of the third-type pixel B), and the second-type pixel G (or the light-emitting element of the second-type pixel G) may be repeatedly arranged. For example, the first-type pixel R and the third-type pixel B may be repeatedly arranged in a first pixel-row (or in an odd row), and the second-type pixel G may be repeatedly arranged in a second pixel-row (or in an even row).

Although it is illustrated in FIGS. 5A through 5C that the unit pixel (or, the display panel) includes the pixels that are arranged in a stripe manner (or an RGB manner), as described above with reference to FIG. 5D, the unit pixel (or the display panel) may include the pixels that are arranged in the pentile manner.

As described above with reference to FIGS. 5A through 5D, the stereoscopic image display panel 100 may include the unit pixel, and the pixels included in the unit pixel may include the light-emitting elements that are densely located in a region corresponding to a center of an area of the unit pixel (or, a central region of the unit pixel). The light-emitting elements may be located at a sufficient distance from an edge of the unit pixel. In an example embodiment, the central region in which the light-emitting elements are located may have a shape that is similar or identical to either a shape of the lens or a shape of the unit pixel. In another example embodiment, the central region in which the light-emitting elements are located may have a shape that is different from both the shape of the lens and the shape of the unit pixel. In other words, the central region (or the shape) in which the light-emitting elements are located may be determined independently of the shape of the lens or the shape of the unit pixel. In addition, the pixels included in the display panel (or the unit pixel) may be arranged in the stripe manner or in the pentile manner.

Figure 6:
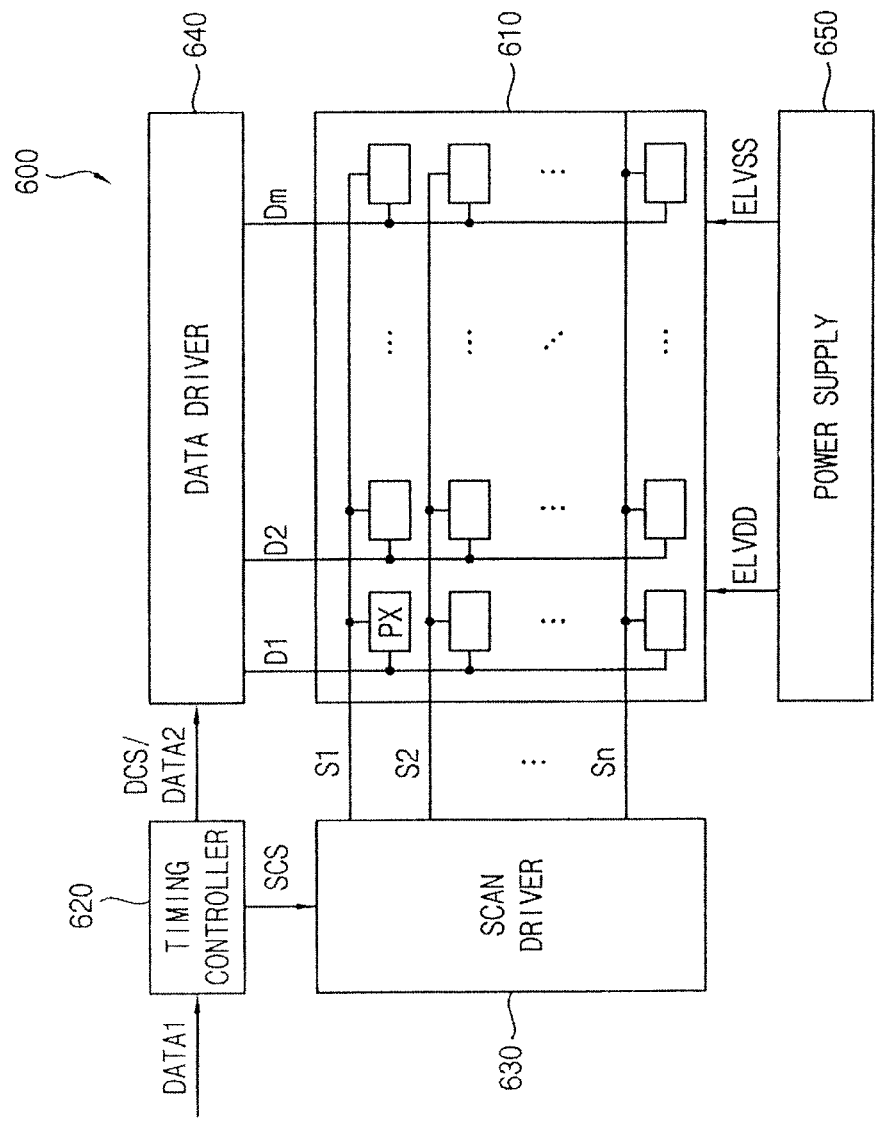
FIG. 6 illustrates a block diagram of a stereoscopic image display device according to example embodiments.

FIG. 6 is a block diagram illustrating a stereoscopic image display device according to example embodiments. Referring to FIG. 6, the stereoscopic image display device 600 may include a display panel 610, a timing controller 620, a scan driver 630, and a data driver 640.

The display panel 610 may be substantially the same as the stereoscopic image display panel 100 or the display panel 110. Thus, duplicated description related thereto will not be repeated.

The display panel 610 may include scan-lines S1 through Sn, data-lines D1 through Dm, and pixels PX, where n and m are integers greater than or equal to 2. The pixels PX may be arranged at intersections between the scan-lines S1 through Sn and the data-lines D1 through Dm. Each of the pixels PX may store a data signal that is provided via the data-lines D1 through Dm based on to a scan signal that is provided via the scan-lines S1 through Sn, and may emit light based on the stored data signal.

As described above with reference to FIG. 1, the pixels PX may be grouped (or, divided) into pixel groups (or, unit pixels) based on a first block (or, lens 121), and the pixel PX included one pixel group (or, one unit pixel) may include light-emitting elements that are densely located in a region corresponding to a center of an area (i.e., a central region) of the pixel group.

The timing controller 620 may receive input data (e.g., first data DATA1) and input control signals (e.g., a horizontal synchronization signal, a vertical synchronization signal, and clock signals) from an external component, may generate image data (e.g., second data DATA2) suitable for an image display of the display panel 610, and may control the scan driver 630 and the data driver 640 by generating a scan driving control signal SCS and a data driving control signal DCS based on the input control signals.

In an example embodiment, the input data (e.g., the first data DATA1) may be multi-view image data, and thus the input data (e.g., the first data DATA1) may include image data having different views in different directions.

The scan driver 630 may generate the scan signal based on the scan driving control signal SCS. The scan driving control signal SCS may include a start pulse and clock signals. The scan driver 630 may include shift registers that sequentially generate the scan signal based on the start pulse and the clock signals.

The data driver 640 may generate a data signal based on the data driving control signal DCS. The data driver 640 may convert the image data as a digital signal to the data signal as an analog signal. The data driver 640 may generate the data signal corresponding to the image data (or data values included in the image data) based on predetermined gray-scale voltages (or gamma voltages) and may provide the data signal to the display panel 610.

The stereoscopic image display device 600 may further include a power supply 650. The power supply 650 may generate driving voltages for operations of the stereoscopic image display device 600. The driving voltages may include a first power voltage ELVDD and a second power voltage ELVSS. Here, the first power voltage ELVDD may be higher than the second power voltage ELVSS. For example, as described above with reference to FIG. 4B, the second transistor T2 may be connected between the first power voltage ELVDD and the second power voltage ELVSS. The second transistor T2 may control a driving current supplied to the light-emitting element based on the data signal, the first power voltage ELVSS, and the second power voltage ELVSS. The light-emitting elements R1, G1, B2, R2, G3, and B3 illustrated in FIG. 4B may be connected between the first power voltage ELVDD and the second power voltage ELVSS.

In example embodiments, the stereoscopic image display device 600 may be a head mounted display (HMD) device. In this case, the stereoscopic image display device 600 may further include a frame (or housing) that supports the display panel 610 and eye lenses. Thus, a viewer (or user) may wear the stereoscopic image display device 600 on his/her head. The eye lenses may directly provide an image that the stereoscopic image display device 600 displays to both eyes of the viewer when the stereoscopic image display device 600 is put on the viewer's head. As the stereoscopic image display device 600 includes the stereoscopic image display panel 100 described with reference to FIG. 1, the stereoscopic image display device 600 may display (or express) a depth of the virtual object in a wider range (e.g., a range that is generated by summing a depth range of a conventional HMD device and a depth range of a conventional glass-free stereoscopic image display device or a range that is generated by combining the depth range of the conventional HMD device and the depth range of the conventional glass-free stereoscopic image display device).

Although a display panel, a stereoscopic image display panel, and a stereoscopic image display device according to example embodiments are described above with reference to FIGS. 1 through 6, those skilled in the art can draw many modifications and changes from the example embodiments without materially departing from the novel teachings and advantages of the disclosure. Embodiments may be applied to various display systems, e.g., a head mounted display (HMD) device, a television, a computer monitor, a laptop, a digital camera, a cellular phone, a smart phone, a video phone, a personal digital assistants (PDA), a portable multimedia player (PMP), an MP3 player, a car navigation system, etc.

By way of summation and review, a display panel according to example embodiments may generate (or form) sufficient views (e.g., the views may be generated in different directions as light passes through lens and a distance between adjacent ones of the views may be less than a specific distance between 3 mm and 4 mm) using fewer pixels because the display panel includes a unit pixel and light-emitting elements included in the unit pixel are densely located (or clustered) in a specific region (e.g., a region corresponding to a center of the lens). Thus, resolution of a stereoscopic image displayed on the display panel may be relatively improved.

In addition, a stereoscopic image display panel according to example embodiments may allow light output from light-emitting elements included in a unit pixel to pass through only one lens because the stereoscopic image display panel includes the unit pixel and the light-emitting elements included in the unit pixel are densely located (or clustered) in a specific region (e.g., a region corresponding to a center of an area of the unit pixel). Thus, crosstalk due to light output from pixels that a boundary between lenses crosses may be prevented.

Further, a stereoscopic image display device according to example embodiments may display a virtual object with a deeper depth and may alleviate (or reduce) eye-strain of a viewer by including the display panel or the stereoscopic image display panel.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A stereoscopic image display panel, comprising:
   a display panel including a plurality of unit pixels, each unit pixel including a plurality of pixels, each pixel of the plurality of pixels emitting light based on a data signal; and
   a lens array including a plurality of lenses, each lens corresponding to a location of a unit pixel of the plurality of unit pixels,
   wherein each pixel of the plurality of pixels includes:
      a light-emitting element; and
      a pixel driving circuit to drive the light-emitting element,
   wherein the light emitting element is closer to a center of an area of the unit pixel than the pixel driving circuit, and light emitting elements in adjacent rows are offset from each other,
   wherein each unit pixel of the plurality of unit pixels includes a first center corresponding to the center of the area of the unit pixel and a first region having an area that is smaller than the area of the unit pixel, and the light-emitting element is located in the first region, and
   wherein each unit pixel of the plurality of unit pixels includes a second region that surrounds the first region, and a pixel driving circuit of a first pixel that is adjacent to an edge of the unit pixel is located in the second region.

2. The stereoscopic image display panel as claimed in claim 1, wherein the center of the area of each unit pixel of the plurality of unit pixels corresponds to a center of an area of the lens corresponding to that unit pixel.

3. The stereoscopic image display panel as claimed in claim 1, wherein the pixel driving circuit includes:
   a first transistor to transfer the data signal to a first node in response to a scan signal;
   a storage capacitor connected to the first node, the storage capacitor to store the data signal; and
   a second transistor connected between a first power voltage and the light-emitting element, the second transistor to control a driving current flowing through the light-emitting element based on the data signal stored in the storage capacitor,
   wherein the pixel driving circuit is located in the second region.

4. The stereoscopic image display panel as claimed in claim 3, wherein the display panel further includes:
   a scan-line to transfer the scan signal to the each of the pixels;
   a data-line to transfer the data signal to the each of the pixels; and
   a first power voltage line to transfer the first power voltage,
   wherein the scan-line, the data-line, and the first power voltage line are arranged in the second region.

5. The stereoscopic image display panel as claimed in claim 1, wherein the unit pixel is symmetrical with respect to a first axis that passes through the center of the area of the unit pixel.

6. The stereoscopic image display panel as claimed in claim 1, wherein:

each lens of the plurality of lenses has a hexagon plane-shape, the plurality of lenses are repeatedly arranged in directions that are perpendicular to sides of the hexagon plane-shape, respectively, and the plurality of unit pixels are repeatedly arranged in the directions.

7. The stereoscopic image display panel as claimed in claim 1, wherein:

the plurality of pixels are arranged at intersections between M pixel-rows and N pixel-columns, where M and N are integers greater than or equal to 2, a first pixel of an (M)th pixel-row of the M pixel-rows has a pixel structure that is different from a pixel structure of an eleventh pixel, the eleventh pixel is adjacent to the first pixel, and the eleventh pixel is included in an (M+1)th pixel-row, and a second pixel of an (N)th pixel-column of the N pixel-columns has a pixel structure that is different from a pixel structure of a twelfth pixel, the twelfth pixel is adjacent to the second pixel, and the twelfth pixel is included in an (N+1)th pixel-column.

8. The stereoscopic image display panel as claimed in claim 1, wherein:

the plurality of pixels are arranged at intersections between I pixel-rows and J pixel-columns, where I and J are integers greater than or equal to 3, the light-emitting elements of J pixels included in a first pixel-row of the I pixel-rows are adjacent to a second pixel-row, the light-emitting elements of J pixels included in an (I)th pixel-row of the I pixel-rows are adjacent to an (I−I)th pixel-row, the light-emitting elements of I pixels included in a first pixel-column of the J pixel-columns are adjacent to a second pixel-column, and the light-emitting elements of I pixels included in a (J)th pixel-column of the J pixel-columns are adjacent to an (J−1)th pixel-column.

9. The stereoscopic image display panel as claimed in claim 8, wherein: the first pixel-column includes at least one selected from a first-type pixel that emits first color light and a third-type pixel that emits third color light, and the second pixel-column includes a second-type pixel that emits second color light.

10. The stereoscopic image display panel as claimed in claim 8, wherein the plurality of lenses are repeatedly arranged in a third direction that is tilted at an acute angle with respect to the I pixel-rows, and the acute angle is determined using [Equation 1] below, $\tan \theta = 1/I$, where $\theta$ denotes the acute angle. [Equation 1]

11. The stereoscopic image display panel as claimed in claim 1, wherein each lens of the plurality of lenses has one of a circle plane-shape, a square plane-shape, and a rectangle plane-shape.

12. The stereoscopic image display panel as claimed in claim 1, wherein:

each unit pixel of the plurality of unit pixels includes i pixels in a first row, where i is an integer greater than or equal to 2, and each unit pixel of the plurality of unit pixels includes j pixels in a second row that is adjacent to the first row, where j is an integer greater than or equal to 2 and is different from i.

13. The stereoscopic image display panel as claimed in claim 12, wherein one pixel included in the first row is adjacent to two pixels included in the second row.

14. A display panel, comprising:

a plurality of pixels to emit light based on a data signal, the pixels being grouped into pixel groups based on a first block, and wherein each of the pixels included in a first pixel group among the pixel groups includes:

a light-emitting element; and a pixel driving circuit located adjacently to an edge of the first block and to drive the light-emitting element, wherein the light emitting element is closer to a center of an area of the first pixel group than the pixel driving circuit, wherein the light emitting elements extend along a first direction, wherein the first pixel group includes at least six light emitting elements being immediately adjacent one another along a second direction orthogonal to the first direction, wherein each of the at least six light emitting elements is located between two respective groups of the pixel driving circuits respectively connected to the at least six light emitting elements, each of the two respective groups of the pixel driving circuits being connected to a respective data line, wherein each pixel of the plurality pixels includes a first center corresponding to the center of the area of the pixel and a first region having an area smaller than the area of the pixel, the light emitting element being located in the first region, and wherein each pixel of the plurality of pixels includes a second region that surrounds the first region, a pixel driving circuit of a first pixel that is adjacent to an edge of the pixel being located in the second region.

15. A stereoscopic image display device, comprising:

a data driver to generate a data signal based on image data;

a display panel including a plurality of unit pixels, each unit pixel including a plurality of pixels, each pixel of the plurality of pixels emitting light based on a data signal; and a lens array including a plurality of lenses, each lens corresponding to a location of a unit pixel of the plurality of unit pixels, wherein each pixel of the plurality of pixels includes:

a light-emitting element; and a pixel driving circuit to drive the light-emitting element, wherein the light emitting element is closer to a center of an area of the unit pixel than the pixel driving circuit, and light emitting elements in adjacent rows are offset from each other, wherein each unit pixel of the plurality of unit pixels includes a first center corresponding to the center of the area of the unit pixel and a first region having an area that is smaller than the area of the unit pixel, and the light-emitting element is located in the first region, and wherein each unit pixel of the plurality of unit pixels includes a second region that surrounds the first region, and a pixel driving circuit of a first pixel that is adjacent to an edge of the unit pixel is located in the second region.

16. The stereoscopic image display device as claimed in claim 15, wherein the lens array is arranged at a focal distance of the lens from the display panel.

17. The stereoscopic image display device as claimed in claim 15, wherein:
N light output from N pixels included in the same pixel-row pass through the lens to generate N views, where N is an integer greater than or equal to 2, and
at least two of the N views are recognized by a viewer according to a location of the viewer.

18. The stereoscopic image display device as claimed in claim 17, wherein:
first light output from a first pixel of the N pixels generates a first view, the first pixel is located in a first direction with respect to a line-of-sight axis that passes through the lens, the line-of-sight being perpendicular to the display panel, and the first view is generated in a second direction with respect to the line-of-sight, and
second light output from a second pixel of the N pixels generates a second view, the second pixel is located in the second direction with respect to the line-of-sight axis, and the second view is generated in the first direction with respect to the line-of-sight.

19. The display panel as claimed in claim 14, further comprising a second pixel group adjacent the first pixel group along the first direction, wherein light emitting elements extend continuously along the first direction between the first and second pixel groups.

20. The stereoscopic image display panel as claimed in claim 1, wherein the edge is along a row direction and the pixel driving circuit is in an offset region.

21. The stereoscopic image display panel as claimed in claim 1, wherein the plurality of pixels of each unit pixel is connected to a same scan line.

* * * * *